(12) United States Patent
Balinsky et al.

(10) Patent No.: US 8,775,395 B2
(45) Date of Patent: Jul. 8, 2014

(54) MANAGING DOCUMENT WORKFLOW

(75) Inventors: Helen Yelena Balinsky, Cardiff Wales (GB); Liqun Chen, Bristol (GB); Steven J Simske, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 245 days.

(21) Appl. No.: 13/294,778

(22) Filed: Nov. 11, 2011

(65) Prior Publication Data

US 2013/0124456 A1    May 16, 2013

(51) Int. Cl.
*G06F 17/30*    (2006.01)

(52) U.S. Cl.
USPC ......................................................... 707/704

(58) Field of Classification Search
USPC ......................................................... 707/704
See application file for complete search history.

(56) References Cited

U.S. PATENT DOCUMENTS

| | | | |
|---|---|---|---|
| 7,272,816 B2 | 9/2007 | Schulz et al. | |
| 7,805,324 B2 | 9/2010 | Green et al. | |
| 7,921,284 B1 * | 4/2011 | Kinghorn et al. | 713/160 |
| 8,341,407 B2 * | 12/2012 | Kinghorn et al. | 713/166 |
| 8,352,477 B2 * | 1/2013 | Uchida et al. | 707/754 |
| 2007/0239783 A1 | 10/2007 | Robinson et al. | |
| 2007/0244823 A1 * | 10/2007 | Thomas Motley et al. | 705/59 |
| 2007/0276714 A1 | 11/2007 | Beringer | |
| 2009/0083110 A1 | 3/2009 | Markovic et al. | |
| 2010/0225505 A1 * | 9/2010 | Yang | 341/22 |
| 2010/0332520 A1 * | 12/2010 | Lu et al. | 707/769 |
| 2011/0225505 A1 * | 9/2011 | Uchida et al. | 715/741 |
| 2013/0031366 A1 * | 1/2013 | Simske et al. | 713/168 |
| 2013/0031369 A1 * | 1/2013 | Balinsky et al. | 713/176 |
| 2013/0124456 A1 * | 5/2013 | Balinsky et al. | 707/608 |

OTHER PUBLICATIONS

A. Shamir, "How to Share a Secret" Massachusetts Institute of Technology, Communications of the ACM, vol. 22, No. 11, Nov. 1979, 2 pgs.

* cited by examiner

*Primary Examiner* — Baoquoc N To (57) ABSTRACT

Methods and apparatus for managing document workflow, including generating a nonce for providing participant access for a particular step of the document workflow, generating a first number of nonce elements, and assigning nonce elements to a plurality of participants of a step of the document workflow preceding the particular step in a one-to-one correspondence. The nonce is determinate from a number of the nonce elements that is greater than or equal to a second number and less than or equal to the first number.

15 Claims, 5 Drawing Sheets

MANAGING DOCUMENT WORKFLOW

BACKGROUND

Composite documents may involve documents having multiple parts that are of different formats, e.g., text, spreadsheets, images, video, html, etc. These parts may further be under the control of different individuals, groups or organizations. It is often desirable to generate such composite documents using a specific sequence, e.g., a document workflow, while providing differing access rights to differing participants throughout the sequence.

For the reasons stated above, and for other reasons that will become apparent to those skilled in the art upon reading and understanding the present specification, there is a need in the art for alternative methods for managing document workflow.

DETAILED DESCRIPTION

To address such problems, various implementations manage access to workflow steps by generating a nonce for providing participant access for a particular step of the document workflow. A nonce may be defined generally as an arbitrary number, word, phrase or other symbol, and is a concept used in generally in cryptography. Where it is desired that the particular step not be accessible until a particular participant of a prior step has accomplished their task within that prior step, the nonce can be assigned to that particular participant. The nonce can then be released by that particular participant of the prior step, such as when particular participant of a prior step has accomplished their task within that prior step. Such access control has been described by the inventors of the present application in U.S. patent application Ser. No. [filed as HP docket number 201006052 to H. Balinsky, S. Simske and L. Chen], which is incorporated by reference in its entirety herein. Where it is desired that the particular step not be accessible until a particular number of participants of a prior step have accomplished their task, a number of nonce elements can be generated and assigned to participants of the prior step. The nonce elements can be used to determine the nonce, provided that a particular number of them have been released by participants of the prior step, such as when they have accomplished their task within the prior step. The nonce is indeterminate if less than the particular number of nonce elements are available.

Access to the particular step of the document workflow can be controlled by providing access keys within key-map files corresponding to each participant of the particular step. Such differential access has been described by inventors of the present application in U.S. patent application Ser. No. [filed as HP docket number 201000332 to H. Balinsky and S. Simske], which is incorporated by reference in its entirety herein.

Each key-map file may further be encrypted using a public encryption key of the corresponding participant, to inhibit access by other participants or non-participants. To inhibit access to the particular step, these encrypted key-map files may then be combined with the nonce for that particular step. Combination of a key-map file with the nonce results in masking of the encrypted files, thereby hindering decryption even where a private key of the corresponding participant is available. To enhance security, the nonces should be unknown to the various participants of the document workflow. Thereby, access the particular step is inhibited until the nonce corresponding to the particular step is released from the assigned participant of the prior step, or a sufficient number of nonce elements are released from the assigned participants of the prior step in order to determine the nonce. At that time, the nonce may be separated from the masked key-map file, and the key-map file may then be accessed using a private key of the corresponding participant.

Publicly Posted Composite Documents (PPCDs) address the problem of composite documents with different formats and differential access control participating in cross-organizational workflows distributed over potentially non-secure channels. Two fundamental workflow types, i.e., ordered and unordered, have been previously addressed by inventors of the present application. See, U.S. patent application Ser. No. [filed as HP docket number 201000332 to H. Balinsky and S. Simske]. However, fragments of such pure workflow types are likely to be combined into mixed workflows with interleaved ordered and unordered workflow steps. Various implementations herein address the problem of enforcing order in transitions between different types of workflow steps: from an unordered step to an ordered step and vice versa, and from one unordered step to another. This can inhibit the participants of any workflow step from being able to access a PPCD document prior to their appropriate workflow step.

Document-centric workflows are fundamental to many organizations. At the same time, document sharing, workflow support, user authentication and other workflow-enabling services are often locked within organizational firewalls for various reasons, ranging from the organization's security policies to software license concerns. Internal processes, however optimized and important, may only be a small part of the business of large companies. They may not be able to exist without collaborating with customers, partners, suppliers and vendors. Various types of external collaborations are emerging too: companies forming alliances, participating in standards bodies or forums, acquiring government certifications, undergoing external audits, and outsourcing or merging. These are just a few examples of 'non-contained' document workflows. These cross-organizational workflows often carry information of different levels of sensitivity: auditing information, prospective mergers and acquisitions, tender proposals or patent applications, etc., many of which may involve multiple participants from different organizations, and security domains that require different levels of access.

Despite the growing availability of cloud-based and other web services, it is often difficult, undesirable or impracticable to involve third party services to provide access control and workflow order enforcement as both the confidential document contents and the authentication of workflow participants may need to be fully disclosed to such a service. The situation can be further exacerbated if the existence of the workflow itself is desired to remain confidential. As a result, documents are often delivered over traditional e-mails or posted on portable storage media, such as flash drives, CD, DVD, etc.

The situation may further be complicated by increasing document complexity. Increased complexity includes the separation of a document presentation and its content for reuse, variable data publishing and multiple presentations embedded within the same document for a delivery over different channels. Documents have often become composites of differently formatted files and their fragments "glued" together by various applications.

Disinclination or unfeasibility of deploying a centralized service to enforce the desired access control and workflow order can turn managing such workflows into a difficult task. A composite document may need to be partitioned according to each participant's granted access rights. Each part might then be securely, timely and independently communicated to the corresponding participants, and the received feedback assembled. This may result in some labor intensive merger of all individual disparate contributions, substantial time delays in the workflow completion, and potentially some vital information missing when and where it is needed. Most dauntingly, this can introduce increased potential for human errors.

These cross-organizational composite document workflows can pose a significant security challenge for existing access control technologies as they can cross the boundaries of secure domains and may warrant fine-grained access control. Exported straight out of any existing secure environment, PPCDs can provide embedded access control and enforced workflow order that allows documents to be shipped freely between workflow participants with different access rights over potentially non-secure channels.

As noted, two fundamental workflow types have been previously considered:
1) Strictly Ordered: the order of access is fully determined at the workflow onset with exactly one participant at each workflow step; and
2) Fully Unordered: a one-step workflow, where all participants are allowed to access the document in any order.

Various implementation herein provide for variably ordered workflows, where ordered and unordered steps are interleaved as desired by a business logic. Various implementations facilitate ensuring that participants of any workflow step are inhibited from accessing a document before the document was accessed by some defined set of participants from the previous step.

Within the context of a composite document workflow, a participant for each part of the document at each workflow step can generally be granted one or more access rights, including:
1) Read-Only (RO) access: a part is accessible for reading, but may not be modified by a workflow participant at a workflow step;
2) Read/Write (RW): a part may be read and modified by a participant at a particular workflow step;
3) Verifiable Authenticity (VA), a part cannot be read or changed; nevertheless, the part needs to be accepted as an integral document component and then transferred along the document workflow to be available for subsequent workflow participants with different (higher) access rights;
4) No Access (NA), a workflow participant is not authorized to access a document (e.g., none of its parts) at a particular workflow step; however, there may be at least one other step, where some access is granted for this participant.

These access rights may be granted independently of other participants, other documents parts and other workflow steps. This granting of access rights, however, may not limit the operations that may be performed with a local copy of each, at least readable, part, e.g., it might be played, executed, modified, etc. The situation is similar to secure access to a RO web page, where its local copy can be modified in any way without any effect on the on-line original. In a workflow situation, this web-site "original" is analogous to a document version legitimately propagating along the workflow. Modification of document parts may include a variety of activities, including editing, ratifying, approving, voting, etc.

Access control for a composite document part i may be enabled by two pairs of keys: encryption and decryption keys $\{E_i; D_i\}$, and signature and verification keys $\{S_i; V_i\}$. Each content-part $P_i$, which may be individually accessible, may be first encrypted and then signed:

$$\text{Sign}_{si}(\text{Enc}_{Ei}(P_i))$$

The subsets of keys for use by a workflow participant for each of level of access, RW, RO and VA, are presented in Table 1. Each workflow participant with access VA, RO or RW for at least one part may be provided with the verification keys Vi for all document parts, in order to establish the authenticity of each part when a document is received by any channel. RO access may further be provided by the decryption key Di. To enable part modification RW, encryption Ei and signature Si keys are utilized. An item is decrypted using Di, modified as desired, encrypted using Ei and then signed using Si. A simple example of key distribution in a document with two participants, e.g., users UA and UB, and three document parts is shown in Table 2.

TABLE 1

| Access | Keys Provided | | | |
|---|---|---|---|---|
| RW | $V_i$ | $D_i$ | $E_i$ | $S_i$ |
| RO | $V_i$ | $D_i$ | — | — |
| VA | $V_i$ | — | — | — |

TABLE 2

| | Part 1 | Part 2 | Part 3 |
|---|---|---|---|
| $U_A$ | RW: $V_1, D_1, E_1, S_1$ | RO: $V_2, D_2$ | VA: $V_3$ |
| $U_B$ | RO: $V_1, D_1$ | VA: $V_2$ | RW: $V_3, D_3, E_3, S_3$ |

The subset of access keys corresponding to a participant's granted accesses may be combined into individual key-map entries $M_j$ and each entry may be made accessible to the corresponding workflow participant j through the use of a private key. Placing key-map entries directly into a document serialization enables workflows without an imposed access order. Each workflow participant, once provided with a document, can access it according to the granted rights.

However, in many workflows it may be desirable to ensure that participants may only access the document in a specific order. Access of some participants at unordered workflow steps might be optional, while others might be mandatory. Various implementations allow a particular subset of participants (e.g., all mandatory participants) to complete their editing during an unordered workflow step before the document becomes accessible by participants of the subsequent step. For some workflow types, a quorum may be introduced, e.g., a particular number of workflow participants that need access to a document at an unordered workflow step before it is allowed to be accessed by the next step participants.

Document workflow is defined herein as a sequence or a set of accesses by a group of participants who are expected to contribute to or familiarize themselves with at least some document contents. Contributions may include creative editing, filling in a form, becoming accustomed with some information for ratifying some business deal, etc. A document workflow may also include automated services which may, for example, register an incoming document or timestamp it. To provide the desired access for each workflow participant at the corresponding workflow step, the subset of that participant's keys may be securely delivered within the document itself.

Figure 1:
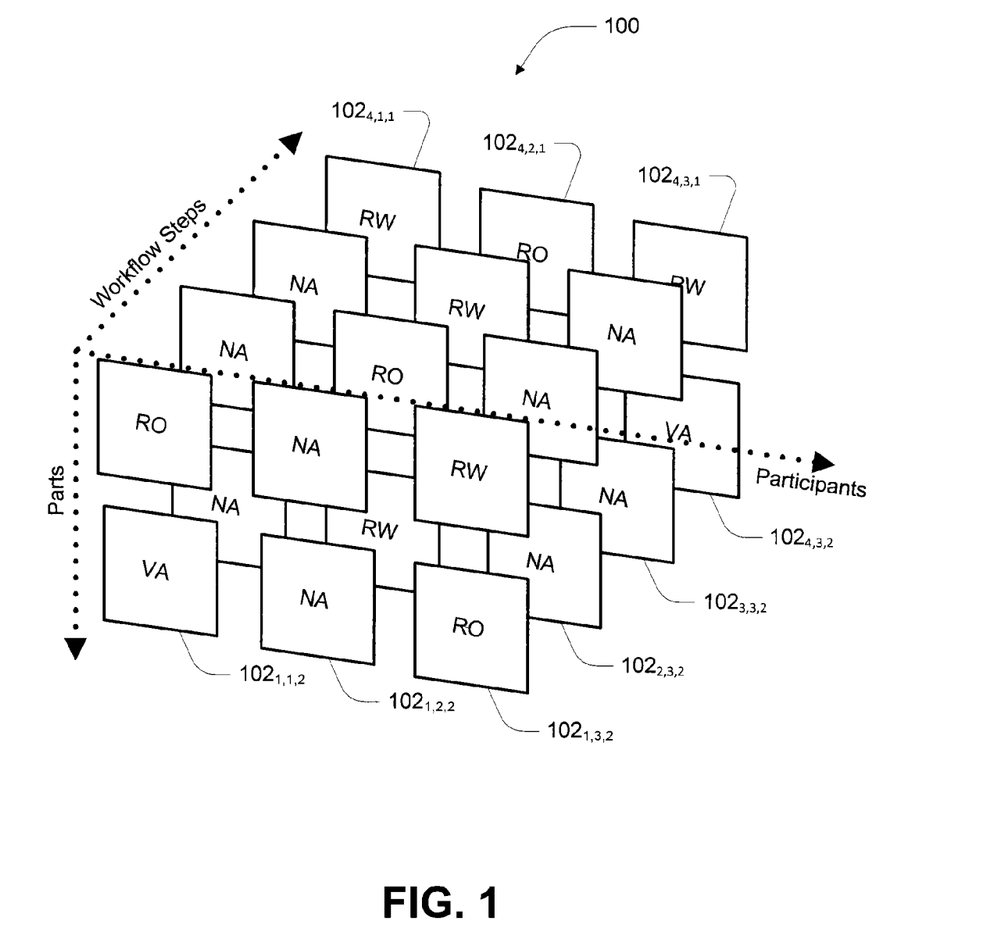
FIG. 1 depicts an example of an access matrix in accordance with an implementation.

Differential access to each part of a document workflow can be described by a three-dimensional Access Matrix: $A=\{A_{ijk}\}$, where i, j and k iterate over the workflow steps, workflow participants and document parts respectively. FIG. 1 depicts an example of an access matrix 100 for a group of three participants over a four-step workflow with a composite document containing two parts, in accordance with an implementation. The access matrix 100 includes access rights $102_{i,j,k}$, wherein i, j, and k represent workflow step, workflow participant, and document part, respectively. For simplicity, not all access rights 102 are labeled. For various implementations, a user granted at least validating access (VA) to one part $P_i$ of a composite document at a workflow step k becomes a workflow participant j:

$$\exists \text{ step k and } \exists P_i \text{ such that } A_{ijk} \in \{VA, RO, RW\} \text{ for user j}$$

The access given to each workflow participant may depend on the level of trust with a corresponding sensitive material and their role in the workflow, and may be different at different workflow steps for the same participant. This level of trust may be decided at the point of workflow creation. Depending on the deployment scenario and the document sensitivity, the document creator may assign discretionary access to document parts and participants or select a pre-defined document template. Once workflow participants and their access rights and order are provided, the corresponding PPCD document may be created and exported out of a secure environment. A PPCD document may propagate along its workflow across a single channel. As such, a workflow participant may be expected to handle document parts whose sensitivity levels are higher than the workflow participant's granted access. To maintain the authenticity of the overall composite document, each workflow participant may validate the authenticity of each part including all parts non-accessible for reading or writing to that participant upon receipt of the document. Thus, for any granted access:

$$A_{ijk} \in \{RO, RW\}, A_{ij\{1..K\}} \neq 0$$

and at least one of $A_{ijk}$=VA where VA stands for the Verification of Authenticity. Higher access rights than VA include RO and RW. The relationship between these access rights VA, RO and RW may be described as VA is a subset of RO, which is a subset of RW, i.e., $$VA \subset RO \subset RW$$

At each workflow step, access may be granted to at least one workflow participant, but some number of participants up to all workflow participants. Depending on the nature of a document and business requirements, workflow participants may be restricted to accessing a document in a particular order. As noted, there are two fundamental types of workflows, i.e., ordered and unordered, with typical workflows usually involving some combination of both types.

Figure 2:
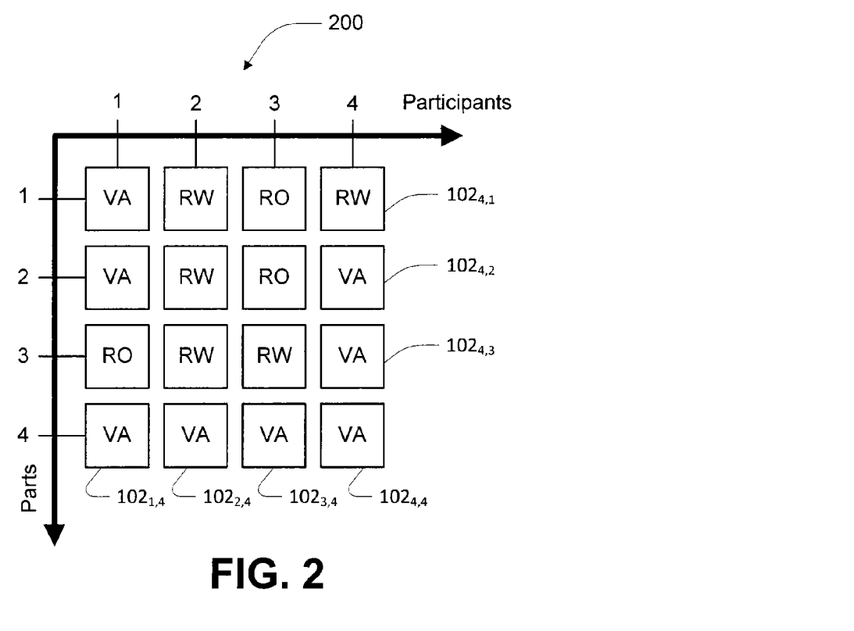
FIG. 2 depicts an example of an access matrix in accordance with another implementation.

An unordered workflow may be defined as a type of workflow under which a set of authorized workflow participants are allowed to access a document in no particular order. For such an unordered workflow, the access matrix of FIG. 1 degenerates into a two-dimensional matrix with only one workflow step. FIG. 2 depicts an example of an access matrix 200 in accordance with an implementation. The access matrix 200 includes access rights $202_{j,k}$, wherein j and k represent workflow participant and document part, respectively. For simplicity, not all access rights 202 are labeled. In the access matrix 200, four participants may transfer the four-part document to each other in no particular order and they have different access granted according to the access matrix 200. Note that in this example, at this particular workflow step, document part 4 is not accessible for reading or writing for any of the participants, i.e., access rights $202_{1,4}$, $202_{2,4}$, $202_{3,4}$, and $202_{4,4}$ provide only verifiable authenticity of that document part to each participant.

Figure 3:
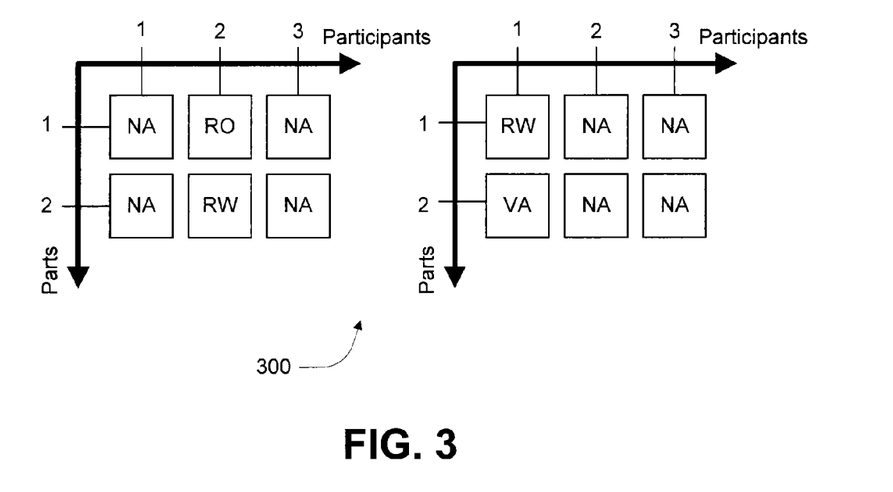
FIG. 3 depicts an example of an access matrix in accordance with another implementation.

A strictly ordered workflow may be defined as a type of workflow under which the participants access the document in a particular order pre-defined by the document master. At any workflow step, participants other than the authorized workflow participant are inhibited from accessing the document, and the authorized workflow participant from each workflow is inhibited from accessing the document prior to or after their authorized step. For such a strictly ordered workflow, the access matrix of FIG. 1 degenerates into a two-dimensional matrix as there is only one authorized participant at each workflow step. FIG. 3 depicts an example of an access matrix 300 in accordance with an implementation. For simplicity, access rights are not labeled.

Unlike in an unordered workflow, the key-map entries for each of the workflow participants may not be made directly accessible in a document serialization, as this can provide a mechanism for out-of-turn access for workflow participants. Thus, the actual key-maps for a workflow participant might only be made accessible immediately prior to that participant's turn to access the document. To inhibit access to the actual key-maps, a nonce may be combined, e.g., XOR or other logical combination, to already encrypted key-map entries starting from the second workflow step. The corresponding sequence of pre-generated random nonces used for such combination may be distributed within the key-map entries themselves, but one step ahead, as described below.

In creating an ordered workflow, individual key-map entries may be created for each workflow step (or each participant). For a workflow with N steps, this means the creation of N corresponding key-map entries $M_1, \ldots, M_N$. Nonces (R) may be generated for N−1 of the steps. For example, nonces may be created for steps 2 through N of the workflow, i.e., $R_2$ through $R_N$. A nonce may be defined generally as an arbitrary number, word, phrase or other symbol. The nonces may be random (e.g., pseudo random). Increases in security can generally be obtained by generating nonces that are difficult or impracticable to guess, calculate or derive. For some implementations, the length of each nonce may be larger than the largest encrypted key-map entries.

After generating the set of nonces, each nonce may be added as a key-map entry for a prior workflow step. For example, starting from the first key-map entry, a modified key-map entry $M^*_i$ may be created by adding a new entry $R_{i+1}$ to $M_i$ for i=1 to (N−1). These modified key-map entries may then be encrypted. For example, a hybrid encryption, which includes a symmetric key and a public key of the workflow participant may be utilized to generate encrypted key-map entries (E), i.e., $E_i$=Enc($M^*_i$) for i=1 to N. Following encryption, the nonce (R) may be combined with the encrypted key-map entries (E) to generate masked key-map entries (X). For example, an XOR($\oplus$) operation may be applied to each encrypted key-map entry with the corresponding nonce starting from the second, i.e., $X_i = E_i \oplus R_i$ for i=2 to N. Encrypted key-map entry $E_1$ and each masked key-map entry $X_i$ for i=2 to N may be placed into the document serialization. In this manner, access to the key-map entries for a subsequent workflow step is inhibited until the corresponding nonce is released from the prior workflow step, allowing separation of the nonce from the masked key-map entry, and thereby allowing decryption using the private keys of the workflow participants.

In accessing an ordered workflow, the first workflow participant is permitted access of the document as that participant's key-map entry $E_1$ is available in full and encrypted using hybrid cryptography with that participant's public key. That first participant then releases the nonce $R_2$ for the second workflow step and so on. The release of a nonce may be at the discretion of the participant, upon decrypting the participant's key-map entry, upon saving and signing the document by that participant, or upon some other trigger designated by the document master. For example, the nonce may be released upon access, completion, etc. Each subsequent workflow participant i is then able to restore their key-map entry using the released nonce, which was released at the previous i−1 step. The workflow participant i then decrypts their key-map entry, accesses the document and releases nonce $R_{i+1}$ for the subsequent workflow step.

Real-life workflows are often a mixture of ordered and unordered fragments of workflow. While each of the workflow steps may be implemented as described above, three transition points exist: from ordered to unordered, from unordered to ordered, and from unordered to unordered.

The transition between ordered and unordered workflow steps is relatively simple and can be achieved by a small variation in the ordered workflow. The key-map entry for the last participant from an ordered fragment contains either one shared nonce or all nonces (which might be the multiple elements of a single nonce) for all participants from the subsequent unordered fragment.

The transition from unordered to ordered is generally more complicated, and involves a few different cases:

Case 1. "A workflow step with alternatives": a group of alternative participants with only one participant from the group required to access the document. Any individual participant in the, unordered step with alternatives is allowed to release a nonce, which will allow the participant in the next step to restore and access his key-map entry.

Case 2. "Quorum": Any t out of J participants (t≤J) in the unordered workflow must release their nonce elements which will allow the participant in the next step to reconstruct his nonce access his map-file. This case can be achieved by using any t-out-of-J secret sharing scheme, an example of which will be described below. To make it work, the document master creates a single nonce, which is used to mask the key-map entries for a corresponding workflow step. The document master also computes shares (e.g., nonce elements) of the nonce in a t-threshold manner, where any t shares can be used to determine the nonce and any t−1 shares or less leave the nonce indeterminate. The nonce elements are used in a similar way as the individual nonce in the ordered workflow and they may be released in response to some trigger as discussed above. If any t participants put their nonce elements together, they will be able to determine the nonce, which will allow them to remove the mask of their map-files. If less than t participants release their nonce elements, none of them can get this nonce and access to their map-files will be inhibited.

Case 3. "Mandatory-optional participants" a pre-defined subgroup t out of J participants (t≤J) may be mandatory, while access of the other participants may be optional. In this case the optional participants release no nonces or nonce elements, while the mandatory participant(s) use a t-out-of-t special case of the secret sharing scheme. Alternatively, in some simple arrangements, the subsequent ordered workflow nonce R can be partitioned between mandatory participants as fragments of the nonce, such that each mandatory participant must release its nonce fragment before the nonce can be determined.

The transition from unordered to unordered is generally the more complicated case, which may be through of as a hybrid of the two transitions described above. There are a few cases depending on what types of unordered steps are at each side of this transition.

Similar to the ordered->unordered situation, once the first unordered step is accomplished either one shared nonce (A) or all nonce elements (B) for all participants from the subsequent unordered step must be released. In case (A), the situation is exactly as with ordered->unordered transition. In case (B) the group of all nonce elements need to be combined and partitioned amongst previous participants such that each of the first unordered step participants releases some nonce element to each of the second unordered step participants.

As described above, it is sometimes desired to have a particular number of participants release the nonce element from their key-map entry before access to the subsequent workflow step is authorized. In general, a nonce element is a number, word, phrase or other symbol that can be used to determine (e.g., restore or calculate) a corresponding nonce. In a simple example, the nonce may be partitioned into fragments, where each participant is assigned a fragment of the nonce. For example, if there are four participants and each of the four participants is required to release their nonce fragment, the nonce can be partitioned into four mutually exclusive fragments. Thus, if the nonce were 11011000, the corresponding nonce elements could be 11, 01, 10 and 00 in this example. Alternatively, if two or more of the four participants could authorize access to the subsequent workflow step, the nonce could be portioned into overlapping fragments. Thus, if the nonce were "secret," the corresponding nonce elements could be "s_cret," "se_ret," "sec_et" and "secr_t" in this example. To approach a more general case of any t out of J participants (t≤J), a (t−1)-degree polynomial may be used. For example, if t is four and J is six, an example polynomial could be:

$$y=a+b*x+c*x^2+d*x^3$$

Substituting x=1 to 6, with a=4, b=1, c=3 and d=2, the nonce elements of 10, 34, 88, 184, 334 and 550 may be calculated. Using any four or more of these nonce elements will allow solving the polynomial, but the polynomial is indeterminate if only three or fewer of these nonce elements are known. For some implementations, the nonce could be the ordinate value of the polynomial at x=0, and the nonce elements could be generated by assigning values (e.g., random or pseudo random values) to coefficients b, c and d in this example. Alternatively, the nonce could be some other ordinate value of the polynomial, or a different one of the coefficients, for example. While the foregoing examples used fairly simple nonces and polynomials, it will be apparent that the examples can be extended to nonces providing for higher levels of security.

The use of nonce elements can further provide the ability to handle quorums of multiple groups, i.e., subsets, of participants of a given step of the workflow. For example, in a simplified collaboration of two departments, if the nonce were "appleorange," a first subset of participants, e.g., one department, could be assigned nonce elements such as "a_ple," "ap_le," "app_e," etc., while a second subset of participants, e.g., the other department, could be assigned nonce elements such as "o_ange," "or_nge," "ora_ge," etc. In this example, two participants from each department would need to release their nonce elements in order to determine the nonce for the workflow step.

A more generalized example might include generating different polynomial equations, as described above, for each subset of participants utilizing the concept of a quorum. For example, each subset of participants could be assigned nonce elements from their corresponding polynomial. Upon release of sufficient nonce elements from each of the subsets of participants, a nonce for each subset of participants could be determined by solving the corresponding polynomials, and the nonce for the subsequent step of the workflow could be determined as some combination of those subset nonces. For example, those subset nonces could be added, multiplied, appended or subjected to some other combinatorial logic to determine the nonce of the subsequent step of the workflow.

As can be seen from the foregoing examples, the nonce elements could be generated from the nonce, or the nonce could be generated from the nonce elements. In other words, while the nonce is determinate from some number of nonce elements, the nonce elements can be generated before or after generating the nonce.

To summarize, the following steps may be followed to create a generic variably ordered workflow. As before $A=A_{ijk}$ is a payload matrix for access control at step i, participant j, document part k. All $A_{ijk}|k=1$ to K for one workflow step i for one participant j may be combined into key-map entry $M_{ij}$. A nonce Ri is generated for each workflow step i and Ri may be:

1) placed into the only one $M_{(i-1)j}$ for this step, if the preceding step (i−1) is ordered; or
2) split between (i−1) step participants and placed into their key-map entries, if the preceding step (i−1) is unordered.

All $M_{ij}$ for each workflow step may be encrypted and signed using hybrid encryption $H_j$ with a public encryption key of participant j, i.e., $E_{ij}=Enc_{Hj}(M_{ij})$. Following encryption, the nonce (R) may be combined with the encrypted key-map entries (E) to generate masked key-map entries (X). For example, an XOR ($\oplus$) operation may be applied to each encrypted key-map entry with the corresponding nonce starting from the second, i.e., $X_i=E_i \oplus R_i$ for i=2 to N. Encrypted key-map entry $E_1$ and each masked key-map entry $X_i$ for i=2 to N may be placed into the document serialization. In this manner, access to the key-map entries for a subsequent workflow step is inhibited until the corresponding nonce or sufficient nonce elements are released from the prior workflow step, allowing separation of the nonce from the masked key-map entry, and thereby allowing decryption using the private keys of the workflow participants. For some implementations, the encrypted key-map entries are masked using the corresponding nonce element if that step is unordered.

Various implementations build on the previous work described in U.S. patent application Ser. No. [filed as HP docket number 201006052 to H. Balinsky, S. Simske and L. Chen] to incorporate the creation and handling of generic mixed workflows. The methods described herein may be implemented, for example, in Java, with PPCD documents built over SQLite database.

To create master and distribution versions of a composite document, all parts and data fragments of the composite document may be selected and added to a document master copy (MC). Workflow participants may be selected with their roles, public keys and contacts, and added to the MC. The desired access control may then be assigned. The same access content-items may be tessellated together to form parts of the distribution version (DV) of the composite document. The access keys for each part may then be generated, encrypted, signed and placed into the DV, with the keys stored in the MC. Individual key-map entries for each workflow participant for each step may then be generated. Nonces may be generated and assigned to workflow steps, stored in the MC and distributed into the corresponding key-map entries within DV as described above. The key-map entries may then be encrypted and signed. The encrypted key-map entries may be masked using the assigned nonces and placed into the DV. The entry-table may then be generated, encrypted by records, signed and placed into the DV.

The resulting DV may be shipped to the first workflow participant, while the MC may be securely retained for the duration of the workflow and may subsequently be archived or discarded.

Figure 4:
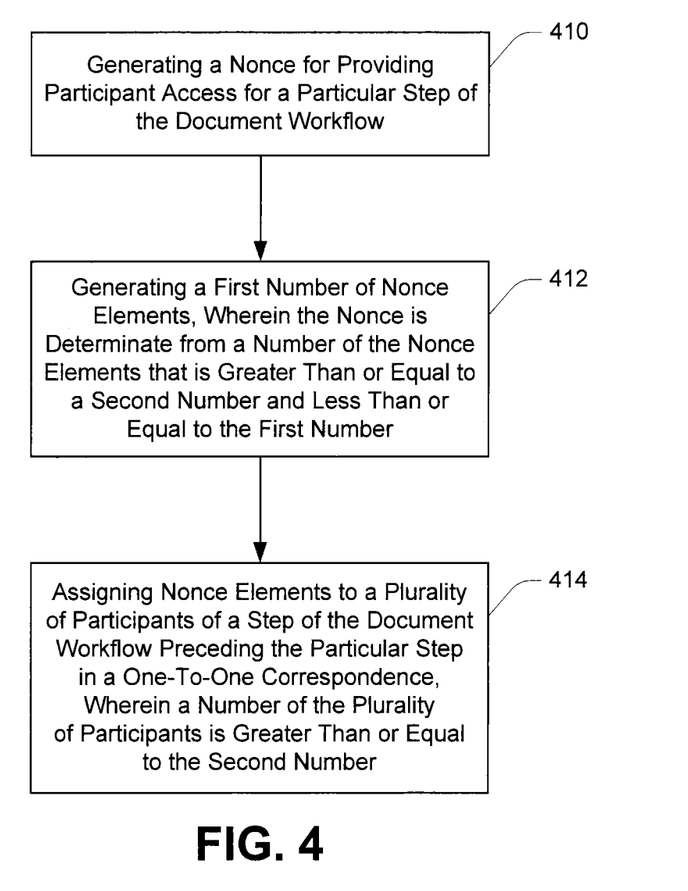
FIG. 4 is a flowchart of a method of managing document workflow in accordance with an implementation.

FIG. 4 is a flowchart of a method of managing document workflow in accordance with an implementation. At 410, a nonce is generated for providing participant access for a particular step of the document workflow. At 412, a first number of nonce elements are generated. The first number may be the number of participants of the preceding workflow step, or some subset of the number of participants of the preceding workflow step. For example, where only a portion of the prior participants are needed to release the preceding step, the number of nonce elements could correspond to this portion of prior participants in a one-to-one correspondence. Further, the number of nonce elements may be greater than the number of participants of the preceding workflow step. The nonce is determinate from a number of the nonce elements that is greater than or equal to a second number and less than or equal to the first number. The second number may be equal to a number of participants from the preceding workflow step that must release their nonce element before the nonce can be determined, i.e., the nonce may be determined using any number of the nonce elements from the second number to the first number, inclusive. For some implementations, the number of participants of the preceding step needed to release that step may be taken from any members of the set of those prior participants. For other implementations, the number of participants of the preceding step needed to release that step may be taken from a subset of members of the set of those prior participants. For still other implementations, the number of participants of the preceding step needed to release that step may include some number of participants from each of a plurality of subsets (e.g., mutually exclusive subsets) of members of the set of those participants. At 414, nonce elements are assigned to a plurality of participants of a step of the document workflow preceding the particular step in a one-to-one correspondence. A number of the participants of the preceding step is greater than the second number.

Figure 5:
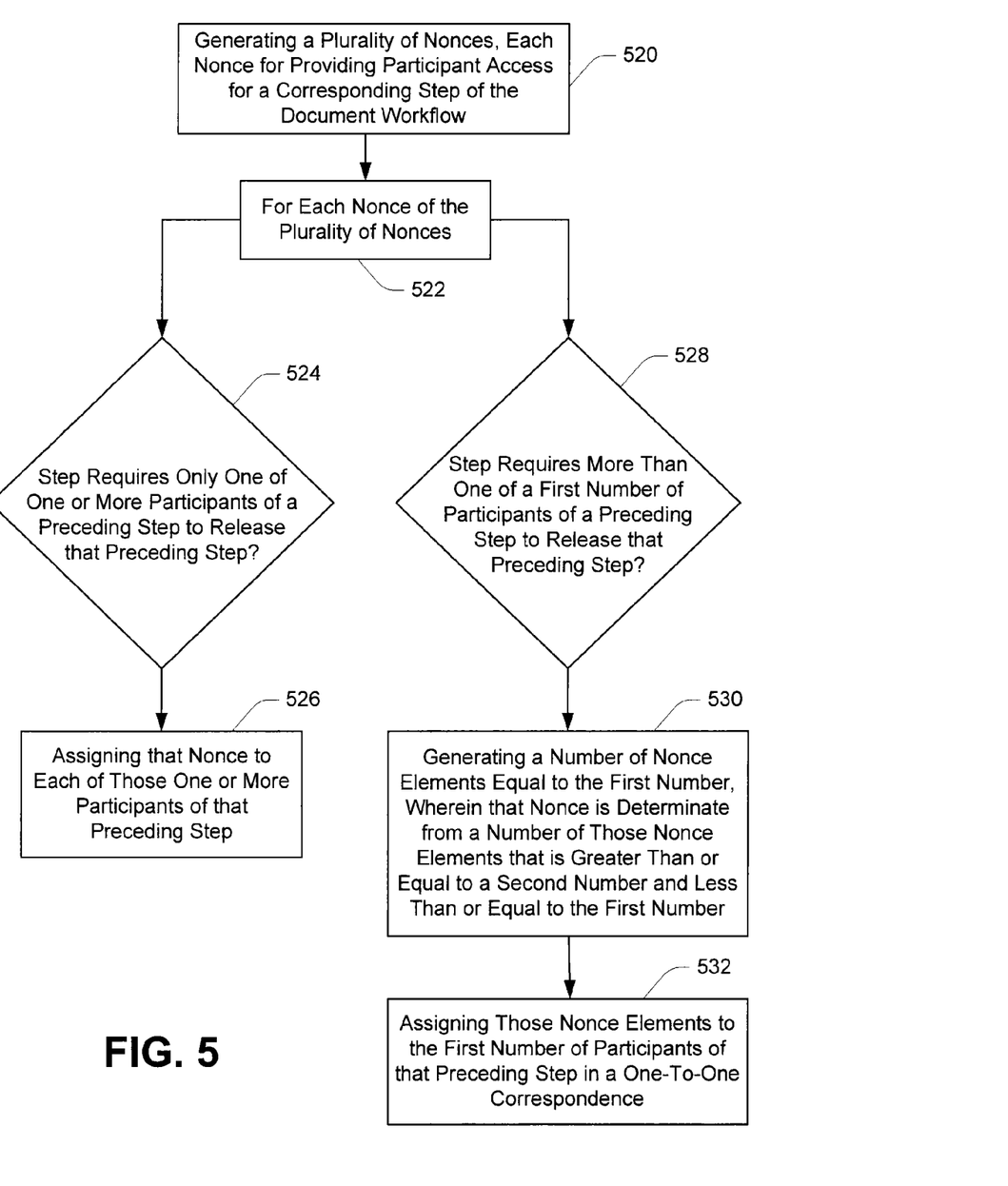
FIG. 5 is a flowchart of a method of managing document workflow in accordance with another implementation.

FIG. 5 is a flowchart of a method of managing document workflow in accordance with another implementation. At 520, a plurality of nonces are generated, each nonce for providing participant access for a corresponding step of the document workflow. For each nonce of the plurality of nonces at 522, a determination is made at 524 as to whether a step of the document workflow preceding that nonce's corresponding step requires only one of one or more participants of that preceding step to release that preceding step. If so, at 526, that nonce is assigned to each of those one or more participants of that preceding step. Alternatively, a determination is made at 528 as to whether a step of the document workflow preceding that nonce's corresponding step requires more than one of a first number of participants of that preceding step to release that preceding step. If so, at 530, a number of nonce elements equal to the first number is generated. The first number may be the number of participants of the preceding workflow step, or some subset of the number of participants of the preceding workflow step. For example, where only a portion of the prior participants are needed to release the preceding step, the number of nonce elements could correspond to this portion of prior participants in a one-to-one correspondence. Further, the number of nonce elements may be greater than the number of participants of the preceding workflow step. That nonce is determinate from a number of those nonce elements that is greater than or equal to a second number and less than or equal to the first number. The second number may be equal to a number of participants from the preceding workflow step that must release their nonce element before the nonce can be determined, i.e., the nonce may be determined using any number of the nonce elements from the second number to the first number, inclusive. For some implementations, the number of participants of the preceding step needed to release that step may be taken from any members of the set of those prior participants. For other implementations, the number of participants of the preceding step needed to release that step may be taken from a subset of members of the set of those prior participants. For still other implementations, the number of participants of the preceding step needed to release that step may include some number of participants from each of a plurality of subsets (e.g., mutually exclusive subsets) of members of the set of those participants. The number of nonce elements generated for a given step and the number of those nonce elements needed to determine their corresponding nonce may be independent of other steps. At 532, those nonce elements are assigned to the first number of participants of that preceding step in a one-to-one correspondence.

It will be appreciated that implementations of the present disclosure can be instantiated by machine-readable instructions, e.g., software, configured to cause a processor to perform methods disclosed herein. The machine-readable instructions can be stored on tangible storage media in the form of volatile or non-volatile storage that is non-transitory in nature. Examples of storage media include solid-state memory (e.g., Read-Only Memory (ROM), Random-Access Memory (RAM), Flash memory, etc.); optical media (e.g., CD, DVD, Blu-Ray™ disks, etc.), magnetic media (e.g., magnetic disks and disk drives, magnetic tape, etc.). Such storage media may be a component part of a computer system, or it may include a removable storage medium.

Figure 6:
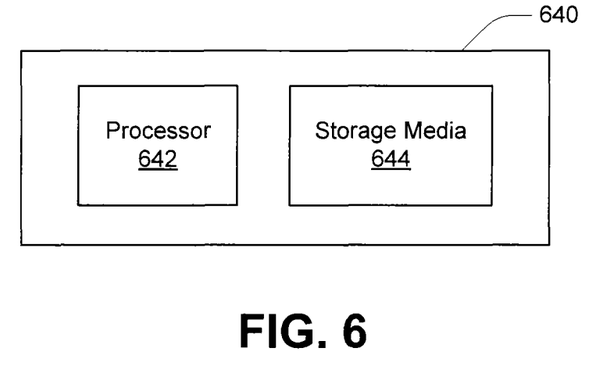
FIG. 6 is a block diagram of an example of a computer system for use with various implementations.

FIG. 6 is a block diagram of an example of a computer system 640 having a processor 642 and a tangible storage media 644 in communication with the processor 640 for use with various implementations. The storage media 644 includes a tangible storage medium and has machine-readable instructions stored thereon configured to cause the processor 642 to perform methods disclosed herein.

What is claimed is:

1. A method of managing document workflow, comprising:
   generating a plurality of nonces, each nonce for providing participant access for a corresponding step of the document workflow;
   for each nonce of the plurality of nonces:
      if a step of the document workflow preceding that nonce's corresponding step requires only one of one or more participants of that preceding step to release that preceding step:
         assigning that nonce to each of those one or more participants of that preceding step; and
      if a step of the document workflow preceding that nonce's corresponding step requires more than one of a first number of participants of that preceding step to release that preceding step:
         generating a number of nonce elements equal to the first number, wherein that nonce is determinate from a number of those nonce elements that is greater than or equal to a second number and less than or equal to the first number; and
         assigning those nonce elements to the first number of participants of that preceding step in a one-to-one correspondence.

2. The method of claim 1, wherein assigning that nonce to each of those one or more participants of that preceding step comprising assigning that nonce to less than all participants of that preceding step.

3. A method of managing document workflow, comprising:
   generating a nonce for providing participant access for a particular step of the document workflow;
   generating a first number of nonce elements, wherein the nonce is determinate from a number of the nonce elements that is greater than or equal to a second number and less than or equal to the first number; and
   assigning the nonce elements to a plurality of participants of a step of the document workflow preceding the particular step in a one-to-one correspondence, wherein a number of the plurality of participants is greater than or equal to the second number.

4. The method of claim 3, wherein generating a first number of nonce elements comprises generating nonce fragments.

5. The method of claim 3, wherein generating a first number of nonce elements occurs prior to generating the nonce.

6. The method of claim 3, wherein assigning the nonce elements to a plurality of participants of a step of the document workflow preceding the particular step in a one-to-one correspondence comprises assigning the nonce elements to less than all participants of the preceding step.

7. The method of claim 3, wherein generating a first number of nonce elements comprises generating the first number of nonce elements using a (second number minus one)-degree polynomial.

8. The method of claim 7, wherein generating a nonce comprises generating the nonce as an ordinate value of the polynomial.

9. The method of claim 3, further comprising:
   combining the nonce with an encrypted key-map entry for the particular step of the document workflow.

10. The method of claim 9, wherein combining comprises XOR-ing.

11. The method of claim 9, further comprising:
   releasing the nonce to a participant for the particular step of the document workflow;
   separating the nonce from the encrypted key-map entry for the particular step of the document workflow; and
   decrypting the encrypted key-map entry with a private key of the participant to obtain access to the particular step of the document workflow by the participant.

12. The method of claim 11, further comprising:
   releasing at least the second number of the nonce elements; and
   determining the nonce from the released nonce elements prior to releasing the nonce.

13. The method of claim 12, wherein releasing at least the second number of the nonce elements comprises at least the second number of the participants of the preceding step releasing their assigned nonce elements upon completion of the preceding step.

14. The method of claim 3, further comprising:
   wherein the first number of nonce elements comprises a first subset of the nonce elements and a second, mutually exclusive, subset of the nonce elements;
   wherein the nonce is determinate from at least a third number of the nonce elements from the first subset of nonce elements and at least a fourth number of the nonce elements from the second subset of nonce elements; and
   wherein the second number equals the third number plus the fourth number.

15. An apparatus for managing document workflow, comprising:
   a processor; and
   a non-transitory computer readable storage media in communication with the processor, wherein the storage media has machine-readable instructions stored thereon configured to cause the processor to perform a method, the method comprising:
      generating a nonce for providing participant access for a particular step of the document workflow;
      generating a first number of nonce elements, wherein the nonce is determinate from a number of the nonce elements that is greater than or equal to a second number and less than or equal to the first number; and
      assigning the nonce elements to a plurality of participants of a step of the document workflow preceding the particular step in a one-to-one correspondence, wherein a number of the plurality of participants is greater than or equal to the second number.

\* \* \* \* \*